(12) United States Patent
Lloyd et al.

(10) Patent No.: US 8,015,571 B2
(45) Date of Patent: Sep. 6, 2011

(54) REGISTERING AN EVENT

(75) Inventors: Matthew I. Lloyd, San Francisco, CA (US); Nicholas Lynn, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 1189 days.

(21) Appl. No.: 11/687,181

(22) Filed: Mar. 16, 2007

(65) Prior Publication Data

US 2008/0229332 A1    Sep. 18, 2008

(51) Int. Cl.
G06F 3/00       (2006.01)
G06F 9/44       (2006.01)
G06F 9/46       (2006.01)
G06F 13/00      (2006.01)

(52) U.S. Cl. ........................ 719/318; 719/320
(58) Field of Classification Search .................... 719/318
See application file for complete search history.

(56) References Cited

U.S. PATENT DOCUMENTS

| | | | |
|---|---|---|---|
| 5,537,541 A | 7/1996 | Wibecan | |
| 5,935,207 A * | 8/1999 | Logue et al. | 709/219 |
| 6,026,139 A | 2/2000 | Hady | |
| 6,393,479 B1 * | 5/2002 | Glommen et al. | 709/224 |
| 6,513,065 B1 | 1/2003 | Hafez | |
| 6,738,737 B1 * | 5/2004 | Carter | 703/17 |
| 7,457,872 B2 * | 11/2008 | Aton et al. | 709/224 |
| 7,792,954 B2 * | 9/2010 | Hanson et al. | 709/224 |
| 2002/0087679 A1 * | 7/2002 | Pulley et al. | 709/224 |
| 2003/0189595 A1 | 10/2003 | Beard et al. | |
| 2006/0284838 A1 | 12/2006 | Tsatalos et al. | |
| 2007/0033275 A1 * | 2/2007 | Toivonen et al. | 709/224 |
| 2010/0091676 A1 * | 4/2010 | Moran et al. | 370/252 |

* cited by examiner

*Primary Examiner* — Diem K Cao
(74) *Attorney, Agent, or Firm* — Fish & Richardson P.C.

(57) ABSTRACT

A computer-implemented method for registering an event includes detecting occurrence of at least one event to be registered in a sequence. The sequence is to have entries for occurred events, each of the entries being a number indicating at least one of the occurred events and being associated with an aggregation number reflecting a number of times the entry has been aggregated within the sequence. The method includes identifying a new entry for extending the sequence, the new entry comprising a first number corresponding to the detected at least one event. The method includes revising the sequence by adding the numbers of at least two entries whose respective aggregation numbers satisfy a criterion for aggregation. The method includes storing the revised sequence.

17 Claims, 5 Drawing Sheets

FIG. 2

| Day | Buckets | | | | | | | Bucket Size | (Day + 1)$_{Binary}$ |
|---|---|---|---|---|---|---|---|---|---|
| 1 | 20 | | | | | | | 1 | 10 |
| 2 | 20 | 30 | | | | | | 1,1 | 11 |
| 3 | 50 | 20 | 10 | | | | | 2,1 | 100 |
| 4 | 50 | 10 | 60 | | | | | 2,1,1 | 101 |
| 5 | 50 | 70 | | | | | | 2,2,1 | 110 |
| 6 | 50 | 70 | 15 | | | | | 2,2,1,1 | 111 |
| 7 | 120 | 35 | 15 | 20 | | | | 4,2,1 | 1000 |
| 8 | 120 | 35 | 25 | 40 | | | | 4,2,1,1 | 1001 |
| 9 | 120 | 35 | 65 | 20 | | | | 4,2,2,1 | 1010 |
| 10 | 120 | 35 | 65 | 55 | | | | 4,2,2,1,1 | 1011 |
| 11 | 120 | 100 | 55 | 15 | | | | 4,4,2,1 | 1100 |
| 12 | 120 | 100 | 55 | 15 | 30 | | | 4,4,2,1,1 | 1101 |
| 13 | 120 | 100 | 55 | 45 | 25 | | | 4,4,2,2,1 | 1110 |
| 14 | 120 | 100 | 55 | 45 | 25 | 25 | | 4,4,2,2,1,1 | 1111 |
| 15 | 220 | 100 | 50 | 30 | 25 | 25 | | 8,4,2,1,1 | 10000 |
| 16 | 220 | 100 | 50 | 30 | 25 | 25 | 10 | 8,4,2,1,1 | 10001 |

REGISTERING AN EVENT

TECHNICAL FIELD

This document relates to registering an event.

BACKGROUND

Many computer systems or solutions involve the use of events. For example, events can be generated in the normal operation thereof, for example when a predetermined condition occurs and is detected, or when the user performs a certain action. Events can be generated in circumstances that are not considered normal, such as in error situations or other exceptional states. Events are generated for one or more purposes and, as such, there is sometimes a predefined recipient of the event notification. For example, an event can be generated and forwarded to a specific component to have that component perform a certain action. As another example, information about an exceptional event can be automatically reported to a responsible component or to an outside entity.

Depending on the nature of the system and other factors, the occurrence of one or more events may be of interest to the recipient, as well as to non-recipients of the event message, or to those that are not the intended recipient of the event. The reason may be to perform diagnostics or other system analysis regarding the operation, perhaps to aid in performance evaluation or maintenance. Another reason may be to record the occurring events as a documentation of the operation, which can be helpful in deciding on whether and how to change anything about the system or solution, to name one example.

SUMMARY

In a first general aspect, a computer-implemented method for registering an event includes detecting occurrence of at least one event to be registered in a sequence. The sequence is to have entries for occurred events, each of the entries including a number indicating at least one of the occurred events and being associated with an aggregation number reflecting a number of times the entry has been aggregated within the sequence. The method includes identifying a new entry for extending the sequence, the new entry including a first number corresponding to the detected at least one event. The method includes revising the sequence including adding the numbers of at least two entries whose respective aggregation numbers satisfy a criterion for aggregation. The method includes storing the revised sequence. For example, the revised sequence can be stored so that it can be used for an operation such as performing a query regarding the occurred events.

Implementations can include any or all of the following features. The new entry can be one of the at least two entries whose numbers are added in revising the sequence. The method can further include extending the sequence by making the new entry at one end of the sequence. The criterion for aggregation can be that a predefined number of entries next to each other in the sequence have a common aggregation number. A determination of whether the criterion for aggregation is satisfied can be performed on the sequence in a direction from recent entries toward older entries. The method can further include determining the aggregation number for at least one of the entries based on an index number reflecting a number of times that new entries have been added to the sequence. The determination can include adding one to the index number; converting the sum to a binary number; forming a modified binary number by removing one bit from the binary number that corresponds to a highest value; and calculating the at least one aggregation number using the modified binary number. Calculating the at least one aggregation number can include interpreting a zero bit in the modified binary number as one entry in the sequence having an aggregation number corresponding to a value of the zero bit; and interpreting a one bit in the modified binary number as two entries in the sequence having a common aggregation number corresponding to a value of the one bit. The aggregation numbers of the entries can be regulated to be powers of an integer number that is at least two. Bit fields of more than one size can be available for each entry in the sequence, and the method can further include selecting one of the bit field sizes for at least one of the entries in the sequence. The method can further include receiving from a remote device event information that indicates the occurrence of the at least one event, the event information being received in batch from the remote device.

In a second general aspect, a system includes an event detecting module that detects occurrence of at least one event to be registered in a sequence. The sequence is to have entries for occurred events, each of the entries including a number indicating at least one of the occurred events and being associated with an aggregation number reflecting a number of times the entry has been aggregated within the sequence. The system includes an event tracking module that (i) identifies a new entry for extending the sequence, the new entry including a first number corresponding to the detected at least one event; (ii) revises the sequence including adding the numbers of at least two entries whose respective aggregation numbers satisfy a criterion for aggregation; and (iii) stores the revised sequence.

Implementations can include any or all of the following features. The event detecting module can receive from a remote device event information that indicates the occurrence of the at least one event, the event information being received in batch from the remote device. The event tracking module can determine the aggregation number for at least one of the entries based on an index number reflecting a number of times that new entries have been added to the sequence. The determination can include: adding one to the index number; converting the sum to a binary number; forming a modified binary number by removing one bit from the binary number that corresponds to a highest value; and calculating the at least one aggregation number using the modified binary number. Calculating the at least one aggregation number can include: interpreting a zero bit in the modified binary number as one entry in the sequence having an aggregation number corresponding to a value of the zero bit; and interpreting a one bit in the modified binary number as two entries in the sequence having a common aggregation number corresponding to a value of the one bit.

Implementations can provide any or all of the following advantages: providing an improved approach for registering events; providing a reduction in the required storage space for registering events; providing an efficient compression of event counts over time; providing a useful data record that can be queried to determine user behavior; providing an event registration technique that is robust, flexible and easily scalable; providing specific guarantees as to the precision of data storage in terms the number of time intervals recorded; and/or providing that more detailed information is retained about recent events than about historical events.

The details of one or more embodiments of the invention are set forth in the accompanying drawings and the descrip-

DESCRIPTION OF DRAWINGS

FIG. 2 is a table showing an example of changes to an event sequence over time.

Like reference symbols in the various drawings indicate like elements.

DETAILED DESCRIPTION

Figure 1:
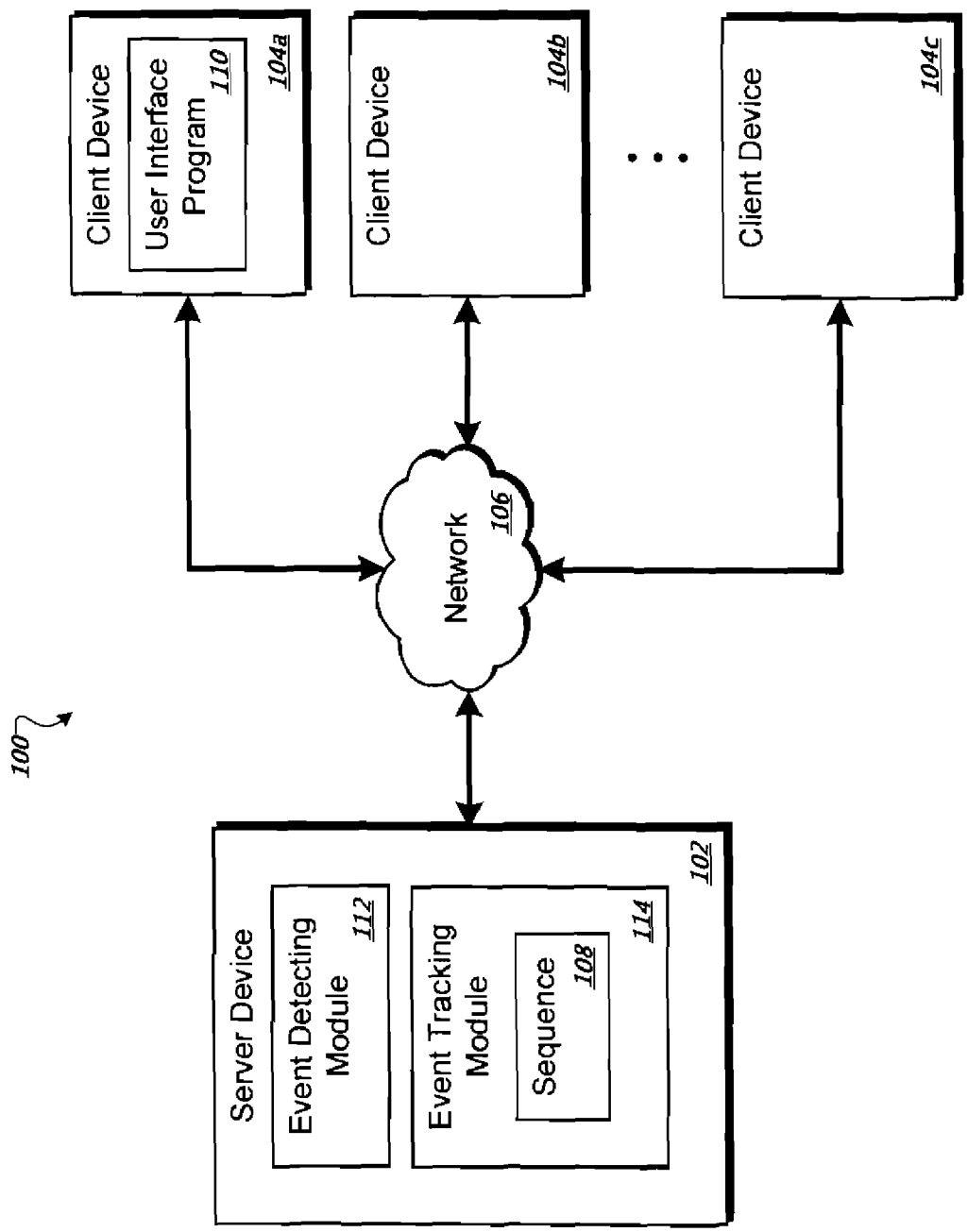
FIG. 1 is a block diagram showing an example of a system for registering events.

FIG. 1 is a block diagram showing an example of a system 100 that can be used for registering events. The system 100 in this example includes a server device 102 and one or more client devices 104a-c. The server device 102 and the client devices 104a-c are configured to communicate through a network 106. For example, during operation the system 100 detects events occurring at one or more of the client devices 104a-c. The detected events are used in creating a record of occurred events that can be stored in the system 100. For example, such a record can be queried to perform statistical analysis of the operation of a part of the system 100, such as to analyze user behavior on the client devices 104a-c. Other architecture configurations are possible.

There will now be described an example of how the system 100 can register occurring events. The system 100 registers a new event by making or updating an entry of a sequence 108. The sequence 108 includes entries representing occurred events detected by the system 100. For example, each entry in the sequence 108 is a number that indicates occurred events. The system 100 may aggregate entries within the sequence 108. In such implementations, each entry has an associated aggregation number that reflects the number of times that the entry has been aggregated. For example, the aggregation number in some implementations directly reflects the number of aggregations, such that an aggregation number of two indicates that the entry has been aggregated twice. In other implementations, the aggregation number reflects the number of entries that are now part of the aggregated entry, such that an aggregation number of two indicates that one aggregation (of two previously non-aggregated entries) has been performed. In such an implementation, the aggregation number can be considered equivalent to a "bucket size" number that is assigned to the individual event count containers, or "buckets", and that gets updated with every aggregation. That is, every new bucket in such an implementation can initially be assigned the bucket size one. If two such buckets are aggregated, the bucket size for the aggregate bucket would be two. If, in turn, the "two" bucket is later aggregated with another "one" bucket, the bucket size for the new aggregate bucket would be three, and so on. The system 100 can perform aggregation at regulated times, such as when the entries meet an aggregation criterion.

Performing aggregation can provide useful benefits. Particularly, aggregation can lead to a considerably lower requirement for storage space than if the event counts were stored in one integer variable for each day. This can be a significant factor in an implementation that is designed to store time series of event counts covering many years of time for hundreds of millions of users. For example, assume that such an implementation needs to manage at least five years of daily counts of event clicks for ten types of events generated by 200 million users. If such data were stored using one integer variable per day and per type and per user, the required storage space would add up to at least 4 Terabyte (4,000 Gigabyte). In contrast, aggregation can reduce the storage needs. For example, one years' worth of data for a single user and one type of event can be summarized and stored in 17 integers or less. Scaled to the circumstances of the example above (five years, 200 millions of users), this would correspond to a requirement for 170 Gigabytes, which reduces the storage need by about a factor of 20.

The client devices 104a-c can each include at least one program, and events may occur in the execution of that program or elsewhere in the client device. For example, the client device 104a includes a user interface program 110. A user of the client device 104a may make an input in the user interface program 110 that the system 100 detects as an event. For example, the event may be a user clicking on an advertisement presented on a web page in the user interface program 110. In some implementations, the client device can accumulate events over a period of time and a group of events may be sent as a batch from one or more of the client devices 104a-c to the server device 102. For example, the user interface program 110 may record a number of clicks on advertisements during a particular web browsing session by the user. The user interface program 110 may then send the batch of advertisement click events to the server device 102 at the end of the web browsing session. Alternatively, the user interface program 110 may report a batch of events to the server device 102 periodically, such as after a predetermined period of time elapses or each day at a particular time of day.

The server device 102 includes an event detecting module 112 and an event tracking module 114. The event detecting module 112 can detect events occurring in the system 100, such as by registering events occurring on the server device 102 or by receiving records of occurred so-called advertisement click events from any or all of the client devices 104a-c. Each of the events may indicate, for example, a number of clicks made (such as a single click) on a particular advertisement during a particular time interval.

The event tracking module 114 can register advertisement click events in an entry of the sequence 108. The event tracking module 114 aggregates entries that meet a predefined aggregation criterion, such as a predefined number of consecutive entries having the same aggregation number. The event tracking module 114 may begin checking the criterion from an end of the sequence 108 corresponding to the newest entries. The event tracking module 114 extends the sequence 108 for a new advertisement click entry, such as a new aggregated entry or new events received from a client device.

FIG. 2 is a table 200 schematically showing an example of changes to the event sequence 108 over time. Each of the rows shown in table 200 corresponds to the contents of the sequence 108 at one of the days 202. The days 202 are index numbers that identify the number of times that entries have been added to the sequence 108. That does not necessarily mean that the sequence 108 has one entry for each day that has passed. In some implementations, the system 100 aggregates entries when a predefined number of entries next to each other in the sequence 108 have the same aggregation number. For example, the system 100 may aggregate the two older entries of three consecutive entries that have the same aggregation number, or it may aggregate any other number of entries, such as all entries for a specific time period. In the case where each entry corresponds to a number of clicks on an advertisement in a particular time interval, the aggregation may include adding the number of clicks for the two oldest entries. The combined number of clicks may be stored in a new entry having an aggregation number that is twice, or the sum of, the aggregation number of the two entries before the aggregation. The result of the aggregation includes two entries, the new entry having twice the aggregation number of the original entries and the newest entry of the original three entries which remains unchanged. Alternatively, an operation other than addition may be used to aggregate entries. For example, if each entry represents an average number of clicks on an advertisement over time, then two entries may be aggregated by adding the values of the two entries and dividing the sum by two.

The table 200 in this example lists instances of the sequence 108 for the days 202 ranging from one through sixteen. The event entries in the sequence 108 for each of the days 202 are here referred to as buckets 204. Each of the buckets 204 includes the number of advertisement click events for the time period represented by the bucket. In this example, the least amount of time covered by a bucket is one day, and a bucket can encompass two or more days as a result of aggregation. Longer or shorter time intervals than one day can be used.

For example, on a first day 202a, the sequence 108 includes a bucket 204a containing the number twenty, which indicates that twenty advertisement click events occurred during the first day 202a. On a second day 202b, thirty clicks are registered. As a result, the sequence 108 then includes the bucket 204a from the previous day and a bucket 204b representing the advertisement click events that occurred on the second day 202b.

The table 200 includes bucket sizes 206 for each of the days 202; that is, for each successive version of the sequence. The bucket sizes 206 indicate the aggregation numbers that the buckets 204 in the sentence have at that time. A bucket size 206a for the first day 202a is the number "1" and indicates that there is one bucket of the smallest size. In this example, the smallest bucket size indicates that the entry includes one day of advertisement click events. Bucket sizes 206b for the second day 202b are the numbers "1,1" and indicate that there are two buckets that each has an aggregation number of one: the bucket 204a received on the first day 202a and the bucket 204b received on the second day 202b.

The event detecting module 112 can receive a new batch of events from the client device 104a at predetermined intervals, such as on a daily basis. Initially, the event detecting module 112 can decide if there is already one or more buckets in the sequence 108 to which the new events pertain (e.g., because the bucket covers a time period when the events were generated). If so, the new event count(s) can be placed in that bucket and it may not be necessary to check whether aggregation should be performed. If, in contrast, there is no existing bucket that matches, the event tracking module 114 may revise the sequence 108 of entries based on the receipt of this information. For example, the event tracking module 114 may check the aggregation criterion after extending the sequence 108 for a new event entry (e.g., first add the new bucket, then aggregate, if applicable). In other implementations, the aggregation criterion can be checked before extending the sequence with any new entry or entries.

As a particular example, on the second day 202b the event tracking module 114 in this example determines that there are now two consecutive entries having the same aggregation number (e.g., an aggregation number of one) after the bucket 204b has been inserted. In this example, the presence of two such consecutive entries does not call for aggregation and the event tracking module 114 therefore does not perform an aggregation for the second day. On a third day 202c, a bucket 204c can be inserted into the sequence 108. The bucket 204c contains the number ten and represents the advertisement click events received from the client device 104a on the third day 202c. As a result of inserting the bucket 204c, the buckets 204a-c satisfy the aggregation criterion used by the event tracking module 114. That is, the buckets 204a-c, which on the third day are situated adjacent to each other in the sequence 108, constitute three consecutive entries having the same aggregation number (e.g., an aggregation number of one). In this example, the event tracking module 114 therefore aggregates the two buckets 204a and 204b into a single bucket 204d. That is, the event tracking module 114 replaces the buckets 204a-b with the bucket 204d. Bucket sizes 206c for the third day 202c indicate that the sequence 108 includes the bucket 204d having an aggregation number of two and the bucket 204c having an aggregation number of one. The bucket 204d has an aggregation number of two because it corresponds to two time intervals' worth of event counts (e.g., it corresponds to two days' worth of event counts). The process can continue through the sixteenth day or longer with adding a new event entry to the sequence 108 each day and performing aggregations where, for example, three consecutive entries have the same aggregation number. In some implementations, the array that is used to store the entries of the sequence can have the entries organized in the opposite order compared to FIG. 2.

For each of the days 202, the number of buckets and the sizes of the buckets may be calculated using the index number of the day. Particularly, there will now be described an example of how the buckets and sizes may be determined by adding one to the index number and interpreting the resulting number using a binary, or base two, format. Each digit of the modified index number in binary format, with the exception of the most significant digit, represents the number of entries in the sequence 108 having an aggregation number of that place value in the binary number. The table 200 includes modified index numbers 208 in binary format for the days 202 that events were registered.

The first day 202a has a modified index number 208a of "10" in binary format. The modified index number 208a includes a value of zero in the least significant digit of the binary number (or the ones place). The value of zero in the least significant digit indicates, according to a predefined interpretation, that the sequence 108 includes one entry on the first day 202a, the bucket 204a. Generally in this example, the predefined interpretation is that the number of entries corresponding to a particular digit of a modified index number is one greater than the value of the digit (e.g., a value of zero in a digit corresponds to one entry and a value of one in a digit corresponds to two entries). The value zero in the ones place here indicates that the corresponding entry has an aggregation number of one. Generally in this example, the aggregation numbers of the one or more entries represented by a digit in a modified index number are equal to the place value of the digit in the binary form of the modified index number. For example, the least significant digit (the digit farthest to the right) has a place value of one (the ones place). A second digit from the right of a modified index number has a place value of two (the twos place). A third digit from the right of a modified index number has a place value of four (the fours place). The place value of each digit increases over the previous digit by a factor of two and the aggregation number of the one or more entries represented by a digit equals the place value of the digit, such that entries represented by a digit in the eights place have an aggregation number of eight. In this example, the value of one in the most significant digit of each modified index number is ignored when interpreting the modified index number to determine the number of buckets and the bucket sizes. Thus the determined aggregation number of "1", is seen to correspond with the bucket size 206a.

Subsequently, the second day 202b has a modified index number 208b of "11" in binary format. The modified index number 208b includes a value of one in the least significant digit (or the ones place). The value of one in the least significant digit indicates that the sequence 108 includes two entries on the second day 202b, the buckets 204a-b. The location of the value one in the ones place indicates that each of the entries has an aggregation number of one. Thus the determined aggregation number of one for the buckets 204a-b, is seen to correspond with the bucket size 206b.

The third day 202c has a modified index number 208c of "100" in binary format. The modified index number 208c includes a value of zero in the least significant digit (or the ones place), and also a value of zero in the next higher place value (the twos place). The value of zero in the ones place indicates that the sequence 108 includes one entry having an aggregation number of one, the bucket 204c. The value of zero in the twos place indicates that the sequence 108 includes another entry having an aggregation number of two, the bucket 204d. Thus the determined aggregation number of one for the bucket 204c and two for the bucket 204d, is seen to correspond with the bucket size 206c.

The calculation of the number of buckets and their sizes may be represented using the following pseudo-code:

```
ModifiedIndexNumber = IndexNumber + 1
BucketSize = 1
TotalNumberOfBuckets = 0
While ModifiedIndexNumber > 1
    NumberOfBuckets = LSB(ModifiedIndexNumber) + 1
    For Index = 1 And While Index <= NumberOfBuckets
        BucketSizes[TotalNumberOfBuckets] = BucketSize
        Increment TotalNumberOfBuckets By 1
        Increment Index By 1
    End For Loop
    ModifiedIndexNumber = Floor(ModifiedIndexNumber / 2)
    BucketSize = BucketSize * 2
End While Loop
```

The modified index number is calculated on the first line of the pseudo-code. The second line initializes the bucket size, also referred to as the aggregation number, to a value of one. The third line initializes the number of buckets to a value of zero. The fourth line is a while loop that repeats the operations within the while loop for each binary digit of the modified index number with the exception of the most significant digit. The fifth line of the pseudo-code determines the number of buckets having an aggregation number associated with the particular iteration of the while loop. The LSB command retrieves the least significant bit of the modified index number. The sixth line begins a for loop that includes operations performed on each bucket having the aggregation number associated with the particular iteration if the while loop. The seventh line of the pseudo-code saves the determined bucket size in an array that stores bucket sizes for each of the buckets. The array is accessed using the count of the total number of buckets. The eight and ninth lines increment the total number of buckets and the index used by the for loop, respectively. The tenth line signals the end of the for loop. The eleventh line divides the modified index number by two. This has the effect of removing the processed least significant bit from the modified index number so that the next to least significant digit may be processed in a subsequent iteration of the while loop. The bucket size, or aggregation number, is multiplied by two on line twelve. Buckets determined in the next iteration of the while loop will have a bucket size twice the size of the buckets in the current iteration. Line thirteen signals the end of the while loop.

Alternatively, the event tracking module 114 may use other aggregation criteria and other methods of calculating the number of entries in the sequence 108 and the aggregation numbers of the entries. For example, the event tracking module 114 may aggregate the three oldest entries of four consecutive entries where the four entries have the same aggregation number. In another example, the event tracking module 114 may aggregate the seven oldest entries of eight consecutive entries where the eight entries have the same aggregation number, such as in the case of an event representing an average number of advertising clicks per day. Aggregating in groups of seven allows the most recent day to be compared to one or more previous weeks.

The number of buckets that must be present adjacent each other for aggregation to be performed can be considered to indicate the amount of compression that is applied in the recording of the event counts. The compression is a measure of the granularity of available event data, particularly as that data becomes old. Generally speaking, with a relatively high compression large amounts of data can be stored While the number of buckets and the sizes of the buckets may be represented using a binary number format, or base two, the number of buckets and the bucket sizes for other aggregation groupings may be represented using a number base equal to the number of entries combined in the aggregation. For example, aggregating three entries may use base three numbers to represent the buckets and aggregating seven entries may use base seven numbers to represent the buckets. A general calculation of the number of buckets and their sizes for aggregation groups of two or greater may be represented using the following pseudo-code:

```
ModifiedIndexNumber = IndexNumber + 1
BucketSize = 1
TotalNumberOfBuckets = 0
While ModifiedIndexNumber > 1
    ModifiedIndexNumber = ModifiedIndexNumber + Base − 2
    NumberOfBuckets = LSD(ModifiedIndexNumber, Base) + 1
    For Index = 1 And While Index <= NumberOfBuckets
        BucketSizes[TotalNumberOfBuckets] = BucketSize
        Increment TotalNumberOfBuckets By 1
        Increment Index By 1
    End For Loop
    ModifiedIndexNumber = Floor(ModifiedIndexNumber / Base)
    BucketSize = BucketSize * Base
End While Loop
```

This pseudo-code adds a line, at the fifth line, that is not included in the previous pseudo-code. The fifth line further modifies the already modified index number by adding an amount equal to the base, or number of entries aggregated into a single entry, minus two. The LSB command from the previous pseudo-code is replaced with an LSD command. The LSD command determines the value of the least significant digit of the modified index number for a particular base. In addition, the lines from the previous code that divide the modified index number by two and multiply the bucket size by two now divide by the base and multiply by the base, respectively.

It is noted that the aggregation depends on at least two parameters that can be flexibly defined: (i) the number of consecutive entries that get combined in one aggregation step (sometimes referred to as the base), and (ii) the number of entries that must be present adjacent each other for aggregation to be performed (sometimes referred to as an aggregation criterion). The second of the two pseudo-codes above addresses variation in (i). Other implementations can use other values of the parameters and other ways of defining the aggregation and/or the aggregation criterion.

The aggregation criteria and bucket calculation examples above were chosen so that the bucket calculation may be performed using the current state of the index number. In other words, if the index number is known, then the number of buckets and their sizes may be calculated. For example, the buckets 204 and the day index number may be stored in a database. On the first day 202a the database includes two pieces of data, the number in the bucket 204a and the current state of the day index number (e.g., the day index number for the first day 202a stores a value of one). On the second day 202b the database includes three pieces of data, the buckets 204a-b and the day index number. On the third day 202c the database still includes three pieces of data as a result of an aggregation, the buckets 204c-d and the day index number.

The use of the index number illustrates another advantage: in some implementations, the sequence can consist of the integers corresponding to the respective buckets, and the index number. Thus, the sequence can be stored in a resource-effective manner in that, say for a single user and considering only one event type, a year's worth of data and the corresponding index number need only take up 17 bytes of storage space.

The event tracking module 114 may use aggregation criteria other than those described above. For example, the event tracking module 114 may initiate an aggregation when four consecutive entries have the same aggregation number. Here, the event tracking module 114 may combine the oldest two entries while leaving two entries unchanged rather than leaving only one entry unchanged as described above. In this way, a minimum number of entries of a particular aggregation number may be maintained rather than reducing to one entry of the particular aggregation number as a result of an aggregation.

Following are two examples that illustrate how the aggregation of event counts can be done when different aggregation criteria are used. The first example uses the criterion that more than three buckets that are next to each other in the sequence have the same aggregation number. The aggregation that is then performed is to aggregate two of those four or more numbers. The examples are presented as follows: each row below that contains one or more numbers represents the final state of the sequence after it has been extended with one or more new buckets, as applicable, and after any aggregation has been performed. The number shown is the aggregation number, where "1" indicates that no aggregation has been performed on that bucket; "2" indicates that one aggregation has been performed; and so on. Also, buckets are assumed to be introduced by adding them on the right side of the sequence; thus, the left side of the sequence corresponds to the buckets containing the oldest event counts. This is the first example:

1,1
1,1,1
2,1,1
2,1,1,1
2,2,1,1
2,2,1,1,1
2,2,2,1,1
2,2,2,1,1,1
4,2,2,1,1

As is seen, the sequence begins with having a single (unaggregated) bucket added on the first row. In the second row, another bucket is added. Because the criterion is not met, no aggregation is performed. Similarly, a third bucket is added on the third line. On the fourth day, however, as the sequence is extended with (or about to be extended with) a fourth bucket, the criterion for aggregation is met. Accordingly, the two buckets furthest to the left of the four are aggregated in this example. For example, the event counts of both buckets are added together in a common "aggregated" bucket. This aggregated bucket is indicated by the aggregation number "2" on the fourth line. The sequence is then extended with more buckets until another aggregation is performed on the sixth line. It is now the two leftmost "1" buckets that are aggregated into another "2" bucket. This process of extending the sequence and aggregating buckets can be continued for as long or as short a time as is required for the event detection. In this example, the tenth (and last) line shows that the two leftmost "2" buckets have been aggregated into a "4" bucket. Thus, a total of ten "new" buckets were introduced in this example and the tenth line shows that five integers are being used at that point to store the event counts.

In the second example, the criterion is instead that more than four adjacent buckets have the same aggregation number. This is the second example:

1
1,1
1,1,1
1,1,1,1
2,1,1,1
2,1,1,1,1
2,2,1,1,1
2,2,2,1,1,1
2,2,2,1,1,1,1
2,2,2,2,1,1,1
2,2,2,2,1,1,1,1
4,2,2,2,1,1,1

It is seen that more integers are sometimes used in this example than on the corresponding line in the previous one (see, e.g., lines four and ten in the present example). On the other hand, the higher number of integers provides a higher resolution in the event counts, which can be an advantage. Thus, different amounts of compression can be applied to the sequence of event counts and this can provide useful benefits.

Figure 3:
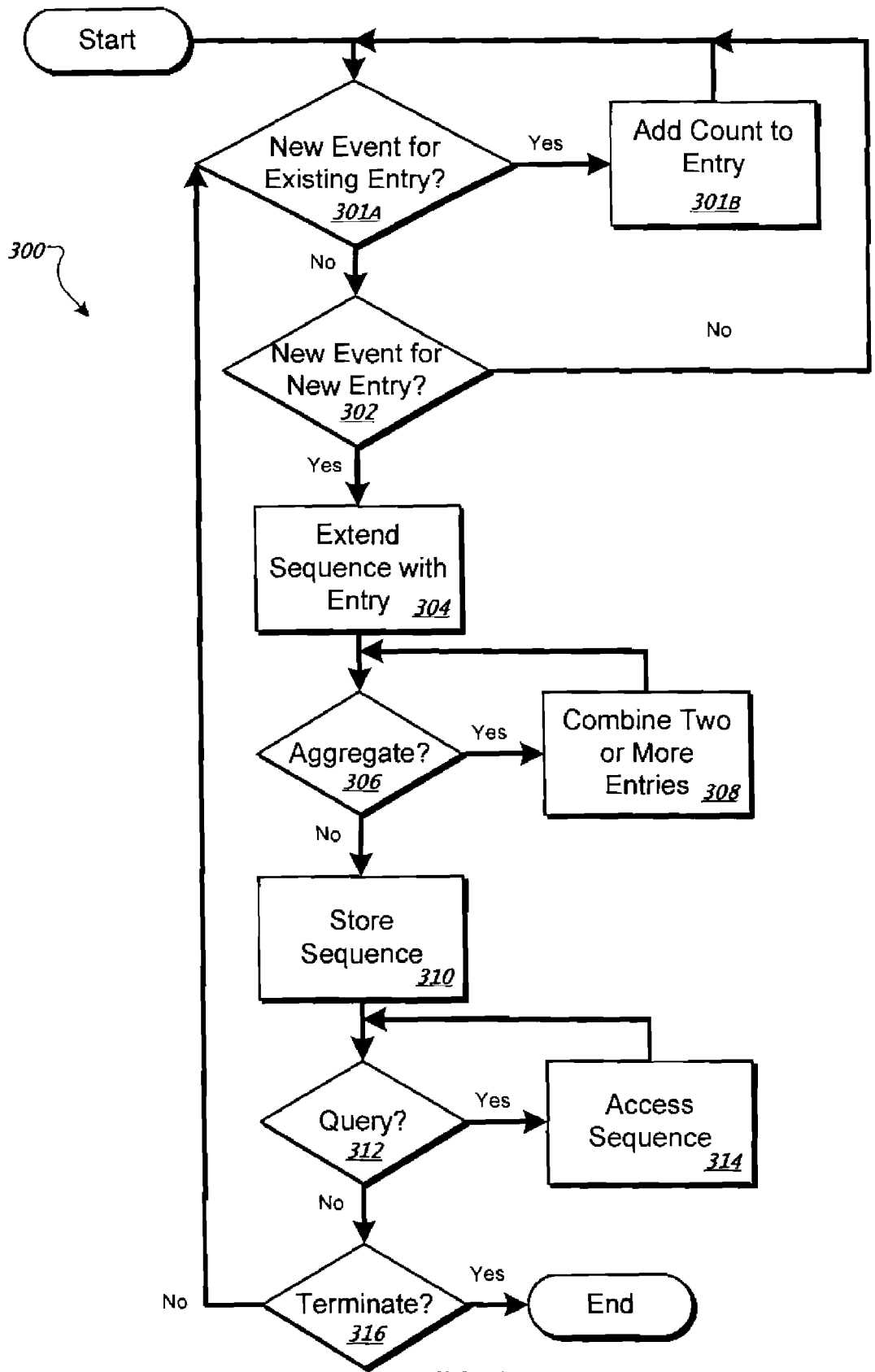
FIG. 3 is a flow chart showing an example of a process for registering events.
Figure 4:
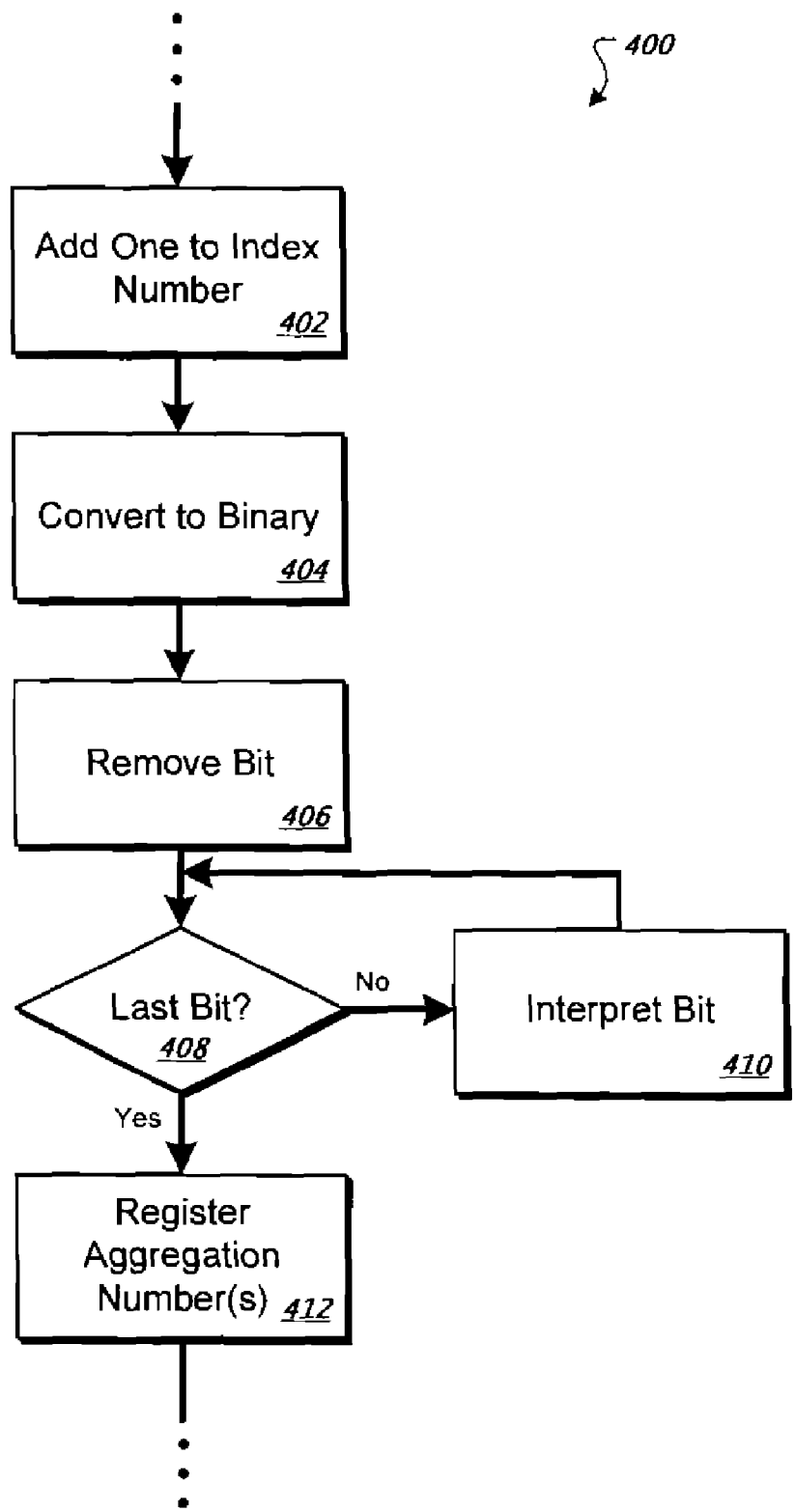
FIG. 4 is a flow chart showing an example of a process for determining aggregation numbers for entries in an event sequence.

FIGS. 3 and 4 are flow charts showing examples of processes 300 and 400, respectively. The processes 300 and 400 may be performed, for example, by a system such as the system 100. For clarity of presentation, the description that follows uses the system 100 as the basis of an example for describing the processes 300 and 400. However, another system, or combination of systems, may be used to perform the processes 300 and 400, including those that are not defined in a client-server configuration.

Referring to FIG. 3, the flow chart shows an example of the process 300 for registering events. In step 301A, it is determined whether a new detected event is to be added to an existing entry in a sequence. For example, this can be the case where a server receives event counts from one or more clients at irregular intervals, and the server uses a time stamp or other chronological information to determine whether the event count(s) should be distributed among one or more existing entries or whether a new entry should be made. If it is determined that the event count is for an existing entry, the count can be added to the entry in step 301B.

If, in contrast, the process 300 detects (302) an occurrence of at least one event to be registered by a new entry in a sequence, then the process 300 in this example extends (304) the sequence with a new entry. That is, the step 304 can be performed for an event that in step 310A was determined not to pertain to any existing entry in the sequence.

The new entry contains a number corresponding to the detected one or more events. For example, the event detection module 112 may receive an advertisement click event from one or more of the client device 104a-c. The event tracking module 114 extends the sequence 108 with a new entry. The new entry includes a number that represents the received event.

If the process 300 determines (306) that at least two entries have aggregation numbers that satisfy an aggregation criterion, then the process 300 aggregates (308) numbers corresponding to the entries and revises the sequence. For example, if the event tracking module 114 determines that the sequence contains three consecutive entries with a common aggregation number, then the event tracking module 114 combines the two older entries.

The process 300 stores (310) the extended and/or revised sequence. For example, the event tracking module 114 may store the sequence 108 in a database or other memory.

If the process 300 receives (312) a request to perform a query regarding events in the sequence, then the process 300 accesses (314) the sequence. For example, the server device 102 may receive an input from a user requesting a query on the sequence 108. The query may seek to determine how many times the user has clicked on an advertisement, to name just one example. The server device 102 retrieves the entry or entries that include the event that occurred in the past. The event may be included, for example, within an entry that has been aggregated many times. In some implementations, a direct comparison between the most recent event and the event in the past may not be possible. In some implementations, the server device 102 estimates the value of the event in the past, such as by multiplying value of the entry or entries that include the past event by the ratio of the aggregation number of the recent entry to the aggregation number of the past entry (or past entries). In some implementations, the server device 102 may recommend to the user a past entry that is close to a requested past event and perform the query using the recommended entry.

If the process 300 receives (316) a request to terminate, then the process 300 ends.

Referring to FIG. 4, the flow chart shows an example of the process 400 for determining aggregation numbers for entries in an event sequence. The process 400 may be performed, for example, during the process 300 while accessing (314) the sequence to perform a query. The process 400 begins by adding (402) one to an index number. For example, the server device 102 may add one to the index numbers for the days 202a-c as shown on the first line of each of the previously described sets of pseudo-code.

The process 400 converts (404) the index number to a binary representation. For example, when aggregating entries by combining two entries, the number of entries and the sizes of the entries may be represented by a binary number related to the index number. In the fifth line of the first set of pseudo-code described above, the LSB command interprets the modified index number as a binary number. The modified index number in binary format is also shown in the table 200 as the modified index numbers 208a-c. In another example, such as when three entries are combined during each aggregation operation, the modified index number may be interpreted as a base three number. This is shown in the sixth line of the second set of pseudo-code previously described. The LSD (least significant digit) command in the sixth line interprets the modified index number as number having the specified base.

The process 400 removes (406) the most significant digit from the binary representation of the index number. For example, the "While ModifiedIndexNumber<1" condition on the fourth line of both sets of pseudo-code has the effect of stopping the processing of the digits of the modified index number before the most significant digit is processed. In this way, the most significant digit is ignored or removed from processing. Particularly, in some implementations, the most significant digit may not be literally removed or subtracted from the modified index number. However, as shown in the two examples of pseudo-code above processing of the digits stops before processing the most significant digit and the most significant digit is ignored.

If the process 400 determines (408) that there is a digit remaining in the binary representation of the index number to be interpreted, then the process 400 interprets (410) the remaining digit. For example, there are a number of entries equal to the value of the digit plus one that are associated with the digit. Each entry associated with the digit has an aggregation number equal to the place value of the digit.

The process 400 registers (412) one or more aggregation numbers associated with the interpreted digits of the binary representation of the index number. For example, the server device 102 may use the determined number of entries and the aggregation numbers to calculate a particular entry in which a past event is included. The process 400 may be initiated, for example, as a result of a query input to the server device 102 by a user. The process 400 ends when each digit of the modified index number has been interpreted and the corresponding aggregation numbers and sizes have been registered.

Figure 5:
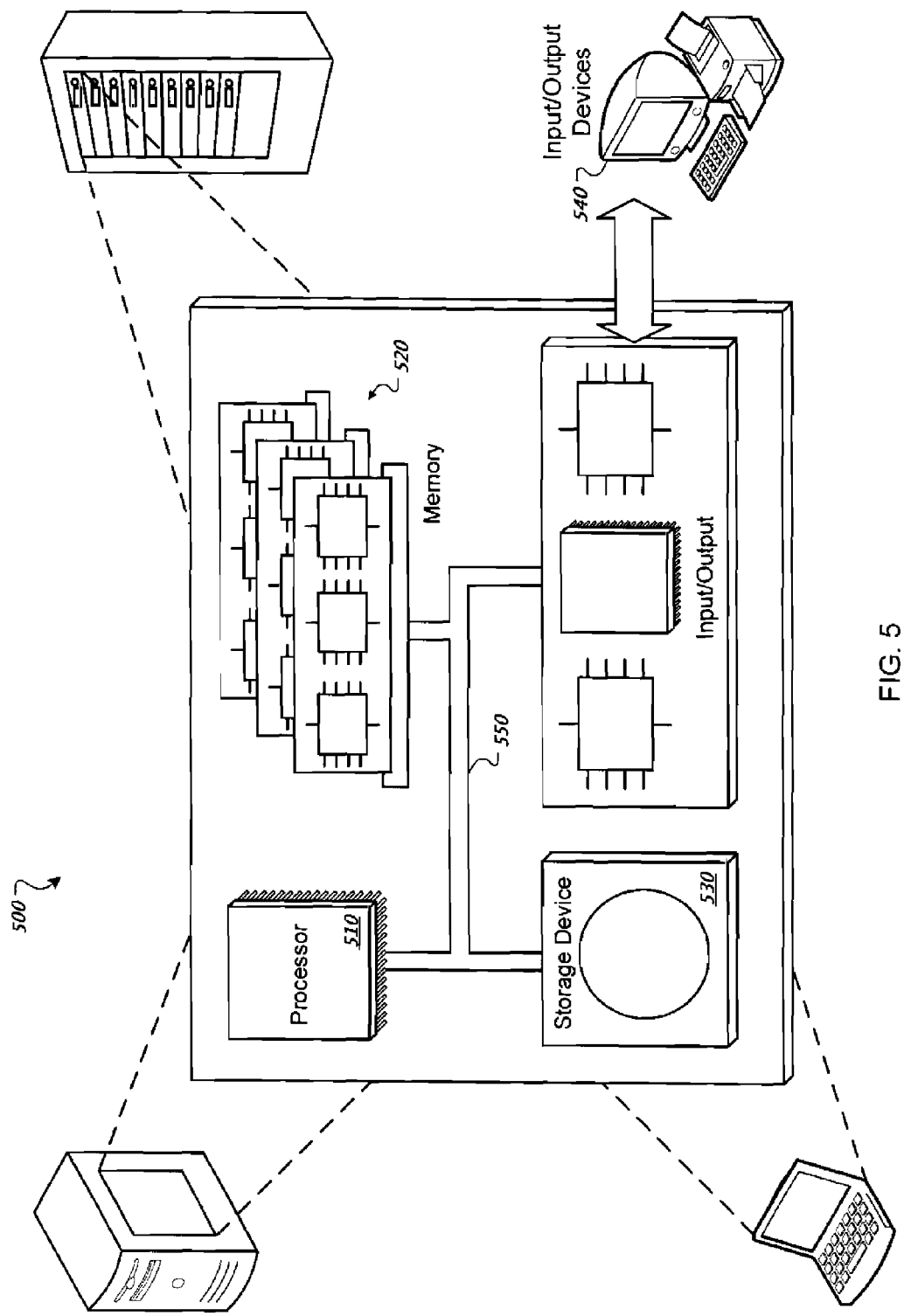
FIG. 5 is a block diagram of a computing system that can be used in connection with computer-implemented methods described in this document.

FIG. 5 is a schematic diagram of a generic computer system 500. The system 500 can be used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method for registering an event, the method comprising:
   detecting occurrence of at least one event to be registered in a sequence, the sequence to have entries for occurred events, each of the entries including a number indicating a number of occurrences of at least one of the occurred events and being associated with an aggregation number reflecting a number of times the entry has been aggregated within the sequence;
   identifying a new entry for extending the sequence, the new entry including a first number corresponding to the detected at least one event;
   revising the sequence including adding the numbers of at least two entries whose respective aggregation numbers satisfy a criterion for aggregation; and
   storing the revised sequence.

2. The computer-implemented method of claim 1, wherein the new entry is one of the at least two entries whose numbers are added in revising the sequence.

3. The computer-implemented method of claim 1, further comprising extending the sequence by making the new entry at one end of the sequence.

4. The computer-implemented method of claim 1, wherein the criterion for aggregation is that a predefined number of entries next to each other in the sequence have a common aggregation number.

5. The computer-implemented method of claim 4, wherein a determination of whether the criterion for aggregation is satisfied is performed on the sequence in a direction from recent entries toward older entries.

6. The computer-implemented method of claim 1, further comprising determining the aggregation number for at least one of the entries based on an index number reflecting a number of times that new entries have been added to the sequence.

7. The computer-implemented method of claim 6, wherein the determination comprises:
   adding one to the index number;
   converting the sum to a binary number;
   forming a modified binary number by removing one bit from the binary number that corresponds to a highest value; and
   calculating the at least one aggregation number using the modified binary number.

8. The computer-implemented method of claim 7, wherein calculating the at least one aggregation number comprises:
   interpreting a zero bit in the modified binary number as one entry in the sequence having an aggregation number corresponding to a value of the zero bit; and
   interpreting a one bit in the modified binary number as two entries in the sequence having a common aggregation number corresponding to a value of the one bit.

9. The computer-implemented method of claim 1, wherein the aggregation numbers of the entries are regulated to be powers of an integer number that is at least two.

10. The computer-implemented method of claim 1, wherein bit fields of more than one size are available for each entry in the sequence, further comprising selecting one of the bit field sizes for at least one of the entries in the sequence.

11. The computer-implemented method of claim 1, further comprising receiving from a remote device event information that indicates the occurrence of the at least one event, the event information being received in batch from the remote device.

12. A computer program product tangibly embodied in a computer-readable storage device and comprising instructions that when executed by a processor perform a method for registering an event, the method comprising:
  detecting occurrence of at least one event to be registered in a sequence, the sequence to have entries for occurred events, each of the entries including a number indicating a number of occurrences of at least one of the occurred events and being associated with an aggregation number reflecting a number of times the entry has been aggregated within the sequence;
  identifying a new entry for extending the sequence, the new entry comprising a first number corresponding to the detected at least one event;
  revising the sequence including adding the numbers of at least two entries whose respective aggregation numbers satisfy a criterion for aggregation; and
  storing the revised sequence.

13. A system comprising:
  a processor; and
  a computer-readable storage device having stored therein instructions that, when executed, cause the processor to generate:
    an event detecting module that detects occurrence of at least one event to be registered in a sequence, the sequence to have entries for occurred events, each of the entries including a number indicating a number of occurrences of at least one of the occurred events and being associated with an aggregation number reflecting a number of times the entry has been aggregated within the sequence; and
    an event tracking module that (i) identifies a new entry for extending the sequence, the new entry including a first number corresponding to the detected at least one event; (ii) revises the sequence including adding the numbers of at least two entries whose respective aggregation numbers satisfy a criterion for aggregation; and (iii) stores the revised sequence.

14. The system of claim 13, wherein the event detecting module receives from a remote device event information that indicates the occurrence of the at least one event, the event information being received in batch from the remote device.

15. The system of claim 13, wherein the event tracking module determines the aggregation number for at least one of the entries based on an index number reflecting a number of times that new entries have been added to the sequence.

16. The system of claim 15, wherein the determination comprises:
  adding one to the index number;
  converting the sum to a binary number;
  forming a modified binary number by removing one bit from the binary number that corresponds to a highest value; and
  calculating the at least one aggregation number using the modified binary number.

17. The system of claim 16, wherein calculating the at least one aggregation number comprises:
  interpreting a zero bit in the modified binary number as one entry in the sequence having an aggregation number corresponding to a value of the zero bit; and
  interpreting a one bit in the modified binary number as two entries in the sequence having a common aggregation number corresponding to a value of the one bit.

* * * * *